US012215863B2

(12) United States Patent
Beck et al.

(10) Patent No.: US 12,215,863 B2
(45) Date of Patent: Feb. 4, 2025

(54) LIQUID SEAL WITH MATING COLLAR

(71) Applicant: John Zink Company, LLC, Tulsa, OK (US)

(72) Inventors: Bryan Beck, Tulsa, OK (US); Zachary Kodesh, Tulsa, OK (US); Stephen Tindell, Claremore, OK (US); Adam Herrington, Tulsa, OK (US); Jeff William White, Tulsa, OK (US)

(73) Assignee: JOHN ZINK COMPANY, LLC, Tulsa, OK (US)

( * ) Notice: Subject to any disclaimer, the term of this patent is extended or adjusted under 35 U.S.C. 154(b) by 516 days.

(21) Appl. No.: 17/467,271

(22) Filed: Sep. 6, 2021

(65) Prior Publication Data
US 2022/0107087 A1 Apr. 7, 2022

Related U.S. Application Data

(60) Provisional application No. 63/086,999, filed on Oct. 2, 2020.

(51) Int. Cl.
F23G 7/08 (2006.01)
F16J 15/02 (2006.01)
F23G 5/50 (2006.01)

(52) U.S. Cl.
CPC .............. F23G 7/085 (2013.01); F16J 15/02 (2013.01); F23G 5/50 (2013.01)

(58) Field of Classification Search
CPC .... F23G 7/085; F23G 5/50; F16J 15/14; F16J 15/40; F16J 15/02
See application file for complete search history.

(56) References Cited

U.S. PATENT DOCUMENTS

| | | |
|---|---|---|
| 2,636,507 A | 4/1953 | Houghland |
| 3,222,259 A | 12/1965 | Wall, Jr. |
| 3,691,732 A | 9/1972 | Richards et al. |
| 4,538,982 A | 9/1985 | Mcgill et al. |
| 4,844,844 A | 7/1989 | Levy |
| 4,961,703 A | 10/1990 | Morgan |
| 5,520,714 A | 5/1996 | Muschelknautz |
| 5,738,250 A | 4/1998 | Gillingham et al. |
| 2004/0056423 A1 | 3/2004 | Staljanssens |
| 2022/0325798 A1* | 10/2022 | Herrington ............. F16J 15/32 |

* cited by examiner

Primary Examiner — Alfred Basichas

(57) ABSTRACT

A liquid seal mating system to accommodate thermal expansion during elevated-temperature operation, including a collar, sized and shaped to receive a discharge end of a gas-delivery conduit and a fence that surrounds the collar and is attached thereto, wherein when installed, the collar accommodates thermal expansion of the gas-delivery conduit along a longitudinal axis of the gas-delivery conduit and limits movement of the gas-delivery conduit perpendicular to the longitudinal axis. A method for suppressing bulk fluid motion in an elevated-temperature liquid seal, including attaching a mount to an outer shell of a liquid seal and receiving, within a mating collar, a discharge end of a gas-delivery conduit, the mating collar attached to the mount and being sized and shaped to accommodate thermal expansion of the gas-delivery conduit, filling the outer shell with liquid to submerge the discharge end of the gas-delivery conduit, and flowing gas through the gas-delivery conduit.

20 Claims, 6 Drawing Sheets

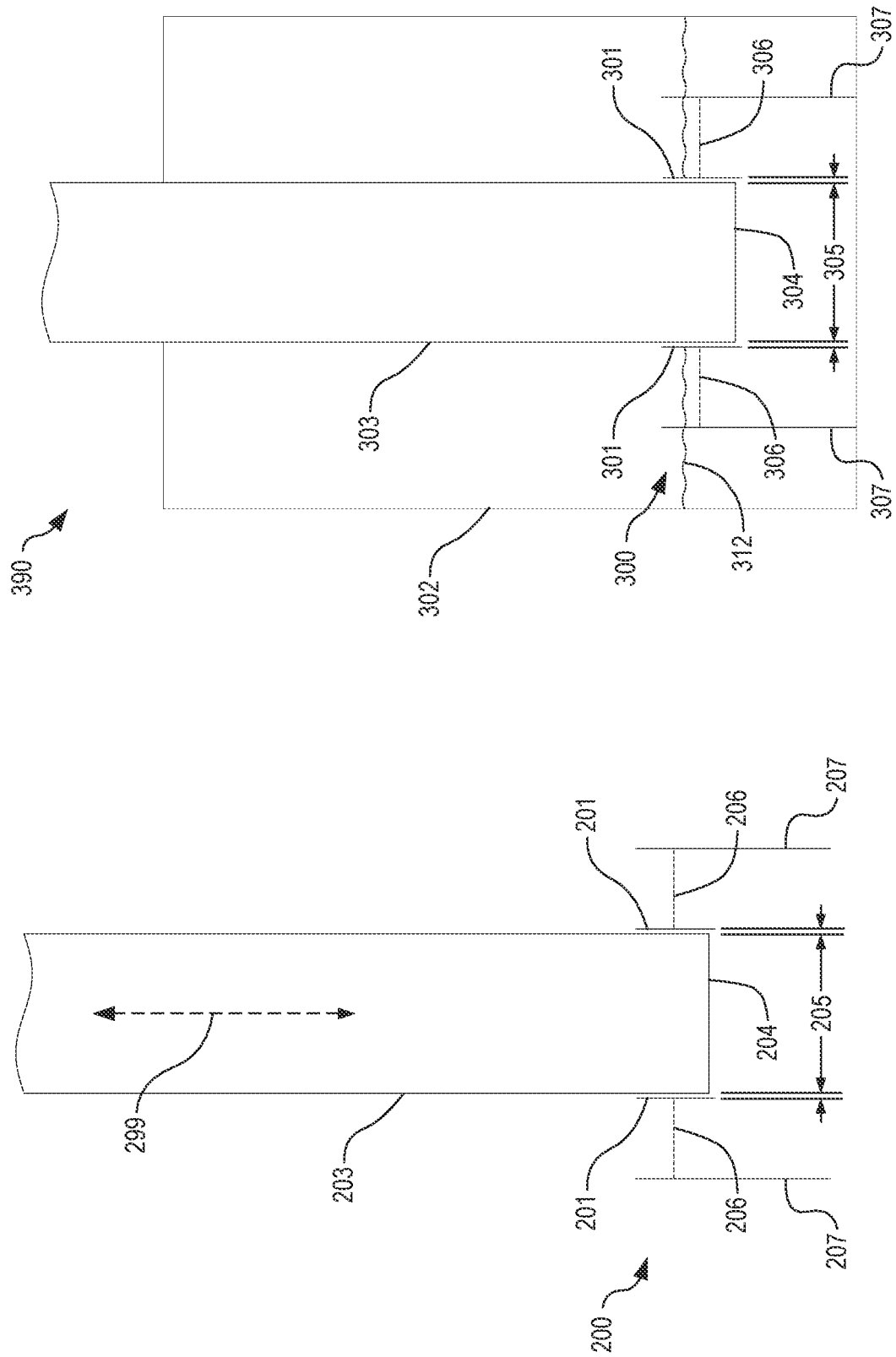

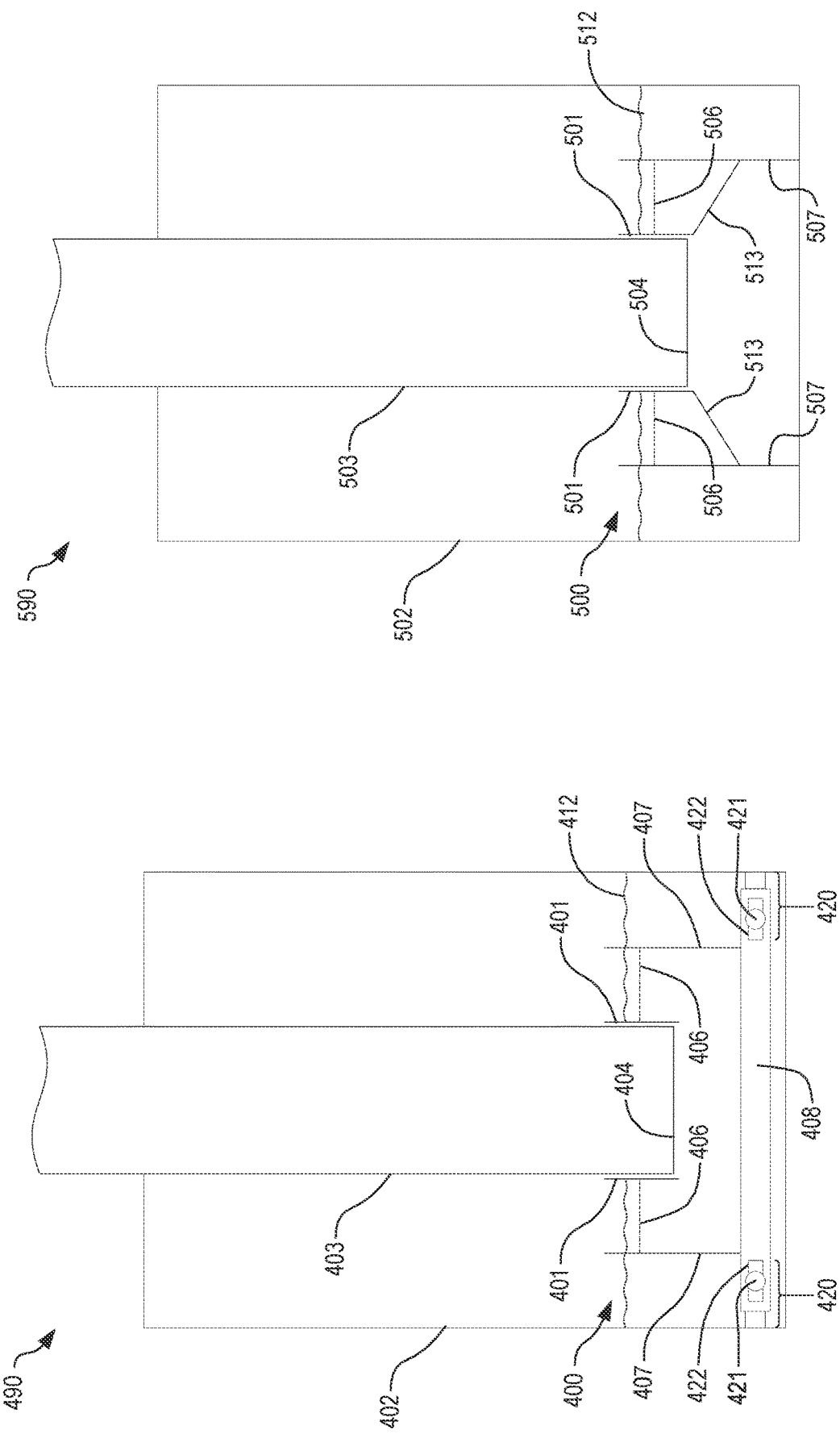

LIQUID SEAL WITH MATING COLLAR

RELATED APPLICATIONS

The present application claims priority to U.S. Provisional Application No. 63/086,999 filed Oct. 2, 2020 which is incorporated by reference in its entirety.

BACKGROUND

In a range of refining and processing industry applications it is necessary to direct a gas flow while preventing backward flow of the gas through a system. In systems such as gas flare stacks, a continuous and stable flow of flare gas is necessary to maintain efficient and reproducible conditions in the flame. If the pressure of the gas delivered to flare is variable, the flare may fail to fully combust the components of the flare gas and the flare may fail to meet environmental emission standards. At optimized conditions, a flare may operate more efficiently and require fewer resources and may also minimize requirements for flame monitoring systems. One way to achieve one-directional gas flow is through use of liquid seals, which direct gas into a liquid reservoir through a conduit (sometimes referred to as a "downcomer") with a submerged orifice. To flow downstream, gas must emerge from the orifice of the conduit and bubble upward to the liquid surface, where it can travel to the outlet of the liquid seal. These systems can also maintain a pressure differential between upstream gas and downstream gas, wherein the upstream gas can remain at an elevated pressure with respect to the downstream gas by adjusting the depth that the conduit orifice is submerged in the liquid.

Pressure fluctuations in the supply gas may cause issues for liquid seals. A sudden surge in upstream pressure may cause a larger flow of gas through the liquid seal that will cause disturbances in downstream processes. For example, surges in pressure can alter the combustion efficiency of flare stacks and may cause increase smoke production and reduced destruction of waste gases. In addition, surges in upstream pressure may also cause the liquid within the liquid seal to slosh, which may cause mechanical strain and also leads to inconsistent gas throughput or damage to the liquid seal.

SUMMARY

Elevated-temperature gas flows cause a problem for liquid seals because thermal expansion of components of the system may cause unwanted stress on joints within the liquid seal. If some components of the liquid seal are in contact with hot gas and other components remain at lower temperature, there will be stress on joints as the components thermally expand at different rates. This thermal stress can cause considerable damage to unions within the liquid seal and lead to shortened life of the liquid seal or additional maintenance costs. For this reason, liquid seals are difficult to implement in elevated temperatures.

The embodiments described herein ameliorates this limitation by introducing a mating collar into which a gas conduit is received but that allows the gas conduit to slide therein. By not fixing the collar to the gas conduit, the mating collar allows the gas conduit to thermally expand without causing thermal stress on the liquid seal. When a liquid seal receives elevated-temperature gas, the gas conduit will undergo significant thermal expansion, which lengthens the gas conduit. In prior liquid seals, this expansion would put significant stress on the joint between the collar and the gas conduit. By allowing for thermal expansion of the gas conduit, the present disclosure affords the use of liquid seals over a much broader range of temperatures.

The embodiments described herein of a liquid seal mating system may be used with a variety of flow-control devices that may be combined without interfering with the mating collar. These include a perforated cone, a semi-permeable fence, gas dispersive elements like chevrons, and modification to the gas conduit orifice like saw-tooth openings. Perforated cones mount near the exit of the conduit and require exiting gas to flow through a mesh-like surface that creates smaller bubbles that help to minimize sloshing of the liquid. Semi-permeable fences also serve to control the flow of upward moving gas to help cause more consistent operation even during surges of pressure. The embodiments described herein are also compatible with "deep seal" liquid seals, where the orifice is submerged further below the liquid surface than in standard liquid seals.

BRIEF DESCRIPTION OF THE FIGURES

FIG. 2 illustrates a configuration of at least some components of the liquid seal mating system of FIG. 1, according to an embodiment.

FIG. 3 illustrates a configuration of at least some components of the liquid seal mating system of FIG. 1, according to an embodiment.

FIG. 4 illustrates a configuration of at least some components of the liquid seal mating system of FIG. 1 with a slotted-bolt connection to mitigate thermal stress, according to an embodiment.

FIG. 5 illustrates a configuration of at least some components of the liquid seal mating system of FIG. 1 with a perforated cone installed, according to an embodiment.

DETAILED DESCRIPTION OF THE EMBODIMENTS

Figure 1:
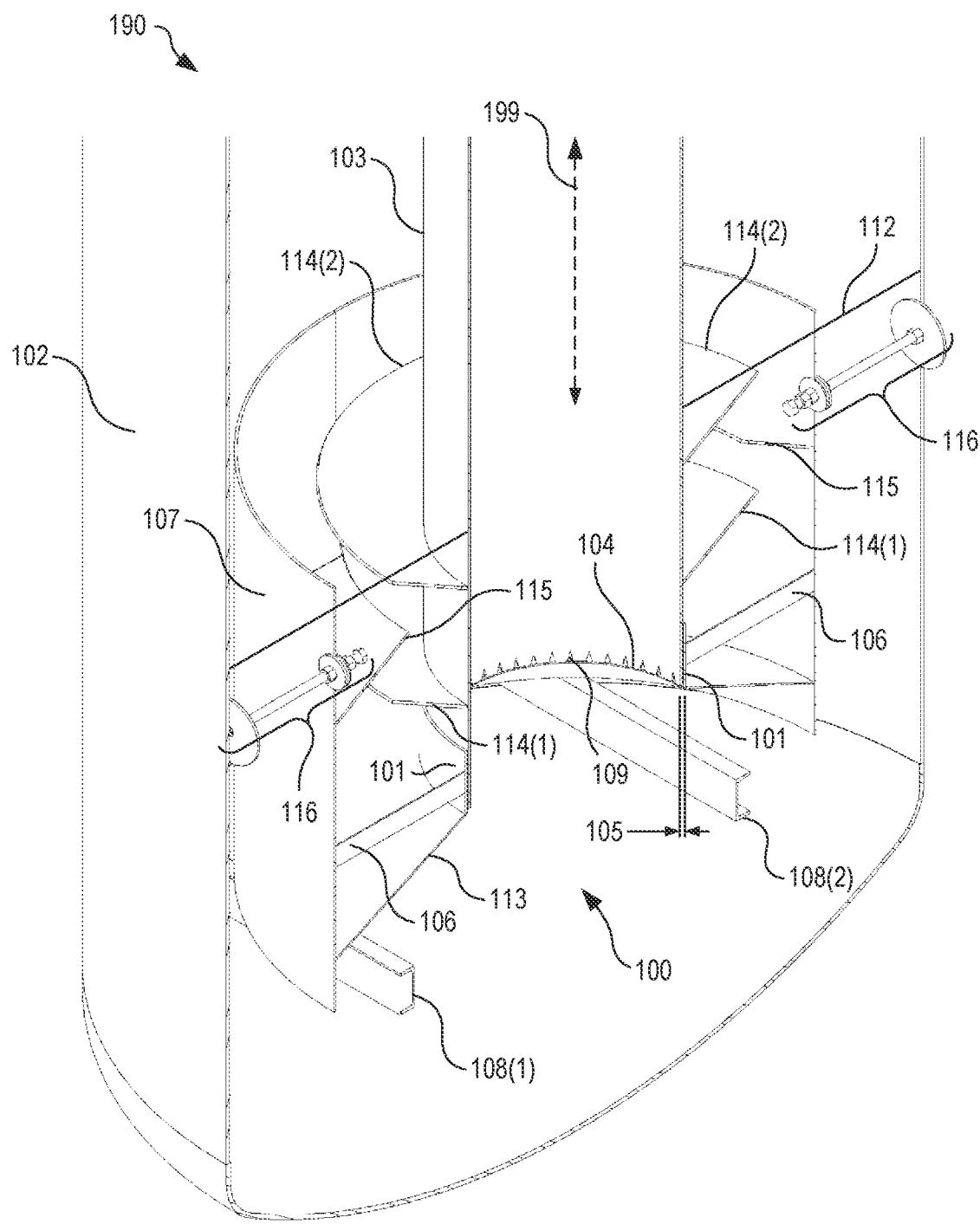
FIG. 1 illustrates one liquid seal mating system installed in a liquid seal with additional components installed, according to an embodiment.

FIG. 1 illustrates a liquid seal 190, in embodiments. The liquid seal 190 includes a liquid seal mating system 100 including a mating collar 101. The mating collar 101 allows a gas-delivery conduit 103 (sometimes referred to as a "downcomer") to slide therein and thus accommodates thermal expansion of the gas-delivery conduit 103 during elevated temperature operation. FIG. 1 is a perspective-view of the liquid seal 190. FIG. 1 indicates a longitudinal axis 199 of the gas-delivery conduit 103, which in FIG. 1 is the same as the longitudinal axis of the liquid seal 190. The liquid seal 190 includes an outer shell 102. The gas-delivery conduit 103 enters the outer shell 102, and is substantially parallel to the longitudinal axis 199.

In an embodiment, the gas-delivery conduit 103 includes a bend such that a portion of the gas-delivery conduit 103 extends perpendicular to longitudinal axis 199 and intersects the outer shell 102. The gas-delivery conduit 103 may bend at angles between 0 degrees and 180 degrees without departing from the scope herein. The gas-delivery conduit 103 illustrated in FIG. 1 is coaxial with the outer shell 102 but other positions of the gas-delivery conduit 103 with respect to the outer shell 102 do not depart from the scope herein. The liquid seal 190 may be rotated from that illustrated in FIG. 1 without departing from the scope herein.

The gas-delivery conduit 103 has a discharge end 104, through which a discharge gas (not shown) may exit the gas-delivery conduit 103. The gas-delivery conduit 103 is slidably received by a liquid seal mating system 100 that includes the mating collar 101 that is sized and shaped to accept the gas-delivery conduit 103 while maintaining a gap 105. The gap 105 may be filled with gasket material such as an o-ring that at least partially seals the gap 105. The mating collar 101 is attached by one or more brackets 106 to a fence 107. The brackets 106 are shown as horizontal brackets, however, any other type of attachment, including direct attachment, may be utilized without departing from the scope hereof.

The fence 107 is mounted to the outer shell 102. The fence 107 is shown mounted to the outer shell with two horizontal beams 108(1) and 108(2), but it should be appreciated that more or fewer beams 108, at varying mounting angles, may be utilized without departing from the scope hereof. Moreover, other types of fastening means may be used to couple the fence 107 to the outer shell 102 (including direct welding thereof) may be used without departing form the scope hereof. In an embodiment, the liquid seal mating system 100 does not use the fence 107 and instead, the mating collar 101 is attached to a mount (not pictured) that is physically attached to the outer shell 102.

In an embodiment, the horizontal beams 108 are mounted to the outer shell 102 with a slotted-bolt connection (420 in FIG. 4). The liquid seal mating system 100 is designed to accommodate thermal expansion to allow operation of the liquid seal 190 over a range of temperatures of discharge gas being supplied by the gas-delivery conduit 103. The mating collar 101 receives the gas-delivery conduit 103 but does physically attach thereto so that the gas-delivery conduit 103 can undergo thermal expansion (and thus slide with respect to the mating collar 101) parallel to the longitudinal axis 199 without causing mechanical stress on the mating collar 101. In addition, the horizontal beams 108 are connected to the outer shell 102 using the slotted-bolt connection 420, providing the advantage that thermal expansion of the horizontal beams 108 will not cause the beams to contact the horizontal shell, where they could damage the shell. The slotted-bolt connection 420 also accommodates thermal expansion of the gas-delivery conduit 403 in a direction parallel to the horizontal beams 108 that would otherwise damage the liquid seal 190.

In an embodiment, the discharge end 104 of the gas-delivery conduit 103 has a saw-tooth profile formed by of a plurality of saw-tooth openings 109 that defines discharge openings. The plurality of saw-tooth openings 109 allow discharge gas to exit the gas-delivery conduit 103 at different rates depending on the pressure of the discharge gas. Attached between the mating collar 101 and the fence 107 is a perforated cone 113, which is attached to the mating collar 101 at an upper edge of the perforated cone 113, and attached to the fence 107 at a lower edge, opposite the upper edge, of the perforated cone 113. As discussed above, the gas-delivery conduit 103 may undergo thermal expansion without causing mechanical stress on the mating collar 101. In embodiments including the perforated cone 113, because the perforated cone 113 is coupled to the mating collar 101, and not to the gas-delivery conduit 103, thermal expansion of the gas-delivery conduit 103 also does not impart mechanical stress on the perforated cone 113. In an embodiment, the perforated cone 113 Is attached to the mating collar 101 at a lower edge of the perforated cone 113 and attached to the fence 107 at an upper edge of the perforated cone 113. The perforated cone 113 may be installed with other positions and orientations with respect to the mating collar 101 and fence 107 without departing from the scope herein.

During operation of the liquid seal 190, the outer shell 102 is filled with a liquid (not shown for clarity). The liquid is filled to a liquid level 112 that is sufficient to submerge the discharge end 104 of the gas-delivery conduit 103 in the liquid. When the pressure of the discharge gas is sufficiently high, the discharge gas exits the gas-delivery conduit 103 and travels upward and out of the liquid. In an embodiment, the liquid seal mating system 100 has one or more gas-dispersion elements, shown as inner chevrons 114, and an outer chevron 115 that reduce unwanted bulk motion of the liquid in response to the motion of the discharge gas. Other types of gas-dispersion elements may be used without departing from the scope hereof. The inner chevrons 114 are mounted to the gas-delivery conduit 103. The outer chevron 115 is mounted to the fence 107. In an embodiment there is at least one additional outer chevron 115(2). The number of out chevrons 115 may vary without departing from the scope herein. In addition to the horizontal beams 108, the fence has a set of mounting fixtures 116 that attach the fence 107 to the outer shell 102 for additional support of the fence 107 during shipping. In an embodiment, the set of mounting fixtures 116 are removed during operation to prevent mechanical strain on the liquid seal mating system 100 or liquid seal 190 caused by thermal expansion.

It should be appreciated that various components discussed above may, or may not, be included in a desired liquid seal 190. Accordingly, FIGS. 2-9 depict various illustrations of combinations of components shown in FIG. 1 forming given liquid seals, where the description of the various features described therein are interchangeable between the figures unless otherwise indicated.

FIG. 2 illustrates a cross-sectional side view of one liquid seal mating system 200 with a mating collar 201 that is sized and shaped to receive a discharge end 204 of a gas-delivery conduit 203 while maintaining a gap 205 between the mating collar 201 and the gas-delivery conduit 203. In an embodiment, mating collar 201 is sized and shaped such that the gap 205 is 0.125 inches. Other dimensions may be used for the gap 205 without departing from the scope hereof so long the gap 205 is sufficiently small that the majority of the discharge gas is output outside the mating collar 201 during maximum designed flow conditions. In an embodiment the mating collar 201 is 6 inches long in a direction substantially parallel to the longitudinal axis 299. Other dimensions of the mating collar 201 may be used without departing from the scope hereof. The mating collar 201 is mounted using a set of brackets 206 to a fence 207 that surrounds the collar 201 and gas-delivery conduit 203. In an embodiment, the collar 201, gas-delivery conduit 203, and fence 207 are cylindrical and mutually concentric. During elevated-temperature operation, the discharge gas (not shown) heats the gas-delivery conduit 203 and causes it to thermally expand. Expansion along the longitudinal axis 299 causes the discharge end 204 to extend downward through the collar 201 but since the collar 201 is not attached to the gas-delivery conduit 203, the expansion does not cause mechanical stress on the liquid seal mating system 200. The liquid seal mating system 200 is an example of the liquid seal mating system 100, of FIG. 1, including only certain components from the description of FIG. 1. The mating collar 201, gas-delivery conduit 203, discharge end 204, gap 205, brackets 206, fence 207, and longitudinal axis 299, are examples of the mating collar 101, gas-delivery conduit 103, discharge end 104, gap 105, brackets 106, fence 107, and longitudinal axis 199 of FIG. 1, respectively, and the descriptions of each respective element apply between the two figures.

FIG. 3 illustrates a cross-sectional side view of one liquid seal mating system 300 installed in a liquid seal 390 (which is an example of the liquid seal 190 of FIG. 1). The liquid seal 390 includes an outer shell 302 into which a gas-delivery conduit 303 penetrates. A discharge end 304 of the gas-delivery conduit 303 is received by the liquid seal mating system 300, which includes a mating collar 301 that is sized and shaped to maintain a gap 305 between the collar 301 and the gas-delivery conduit 303. The mating collar 301 is mounted using a set of brackets 306 to a fence 307 that surrounds the collar 301 and gas-delivery conduit 303. The liquid seal 390 is filled with liquid (not shown) to a liquid level 312, which is sufficient to submerge the discharge end 304 of the gas-delivery conduit 303. The liquid seal mating system 300 is an example of the liquid seal mating system 100, of FIG. 1, including only certain components from the description of FIG. 1. The mating collar 301, outer shell 302, gas-delivery conduit 303, discharge end 304, gap 305, brackets 306, fence 307, and liquid level 312 are examples of the mating collar 101, outer shell 102, gas-delivery conduit 103, discharge end 104, gap 105, brackets 106, fence 107, and liquid level 112 of FIG. 1, respectively, and the descriptions of each respective element apply between the two figures.

FIG. 4 illustrates a cross-sectional side view of one liquid seal mating system 400 with a slotted-bolt connection 420 installed in a liquid seal 490 (which is an example of the liquid seal 190 of FIG. 1). The liquid seal 490 includes an outer shell 402 into which a gas-delivery conduit 403 penetrates. A discharge end 404 of the gas-delivery conduit 403 is received by the liquid seal mating system 400, which includes a mating collar 401 that is sized and shaped to maintain a gap (not shown) between the collar 401 and the gas-delivery conduit 403. The mating collar 401 is mounted using a set of brackets 406 to a fence 407 that surrounds the collar 401 and gas-delivery conduit 403. The fence 407 is attached to the outer shell 402 using a horizontal beam 408 and the slotted-bolt connection 420, which includes a bolt 421 and a slot 422. The slotted-bolt connection 420 allows the liquid seal mating system 400 to mount the horizontal beam 408 to the outer shell 402 and still accommodate thermal expansion of the horizontal beam 408. During elevated-temperature operation, the discharge gas heats the horizontal beam 408 and causes it to thermally expand. The slotted-bolt connection 420 accommodates this expansion while preventing the horizontal beam 408 from transferring the expansion force to the outer shell. The liquid seal 490 is filled with liquid (not shown) to a liquid level 412, which is sufficient to submerge the discharge end 404 of the gas-delivery conduit 403. The liquid seal mating system 400 is an example of the liquid seal mating system 100, of FIG. 1, including only certain components from the description of FIG. 1. The mating collar 401, outer shell 402, gas-delivery conduit 403, discharge end 404, brackets 406, fence 407, horizontal beam 408, liquid level 412, slotted-bolt connection 420, bolt 421, and slot 422 are examples of the mating collar 101, outer shell 102, gas-delivery conduit 103, discharge end 104, brackets 106, fence 107, horizontal beam 108, liquid level 112, slotted-bolt connection 420, bolt 421, and slot 422 of FIG. 4, respectively, and the descriptions of each respective element apply between the two figures.

FIG. 5 illustrates a cross-sectional side view of one liquid seal mating system 500 with a perforated cone 513 installed in a liquid seal 590 (which is an example of the liquid seal 190 of FIG. 1). The liquid seal 590 includes an outer shell 502 into which a gas-delivery conduit 503 penetrates. A discharge end 504 of the gas-delivery conduit 503 is received by the liquid seal mating system 500, which includes a mating collar 501 that is sized and shaped to maintain a gap (not shown) between the collar 501 and the gas-delivery conduit 503. The mating collar 501 is mounted using a set of brackets 506 to a fence 507 that surrounds the collar 501 and gas-delivery conduit 503. The liquid seal mating system 500 includes the perforated cone 513 that is mounted to the mating collar 501 at its upper edge. The perforated cone 513 is attached at its lower edge to the fence 507 for added support. The liquid seal 590 is filled with liquid (not shown) to a liquid level 512, which is sufficient to submerge the discharge end 504 of the gas-delivery conduit 503. The perforated cone 513 is perforated to allow discharge gas (not shown) that has exited the discharge end 504 of the gas-delivery conduit 503 to travel through the perforated cone as it travels upward towards the liquid level 512. This process reduces unwanted bulk motion of the liquid. The liquid seal mating system 500 is an example of the liquid seal mating system 100, of FIG. 1, including only certain components from the description of FIG. 1. The mating collar 501, outer shell 502, gas-delivery conduit 503, discharge end 504, brackets 506, fence 507, liquid level 512, and perforated cone 513 are examples of the mating collar 101, outer shell 102, gas-delivery conduit 103, discharge end 104, brackets 106, fence 107, liquid level 112, and perforated cone 113 of FIG. 1, respectively, and the descriptions of each respective element apply between the two figures.

Figure 6:
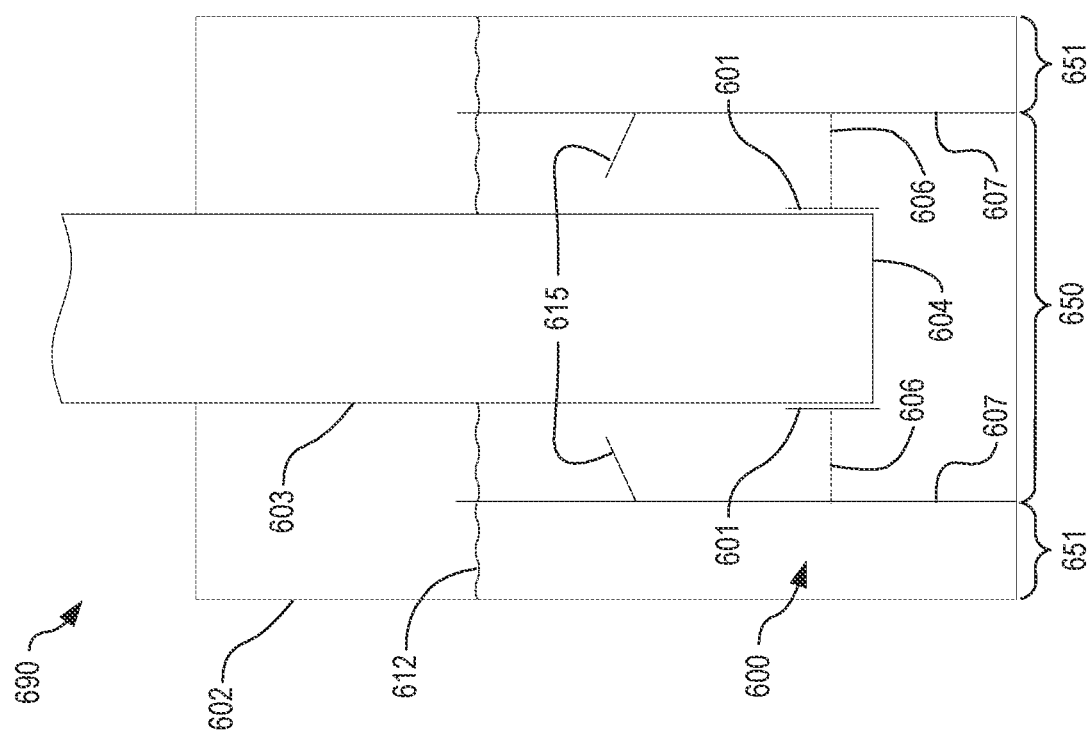
FIG. 6 illustrates a configuration of at least some components of the liquid seal mating system of FIG. 1 with an outer chevron installed, according to an embodiment.

FIG. 6 illustrates a cross-sectional side view of one liquid seal mating system 600 with an outer chevron installed in a liquid seal 690 (which is an example of the liquid seal 190 of FIG. 1). The liquid seal 690 includes an outer shell 602 into which a gas-delivery conduit 603 penetrates. A discharge end 604 of the gas-delivery conduit 603 is received by the liquid seal mating system 600, which includes a mating collar 601 that is sized and shaped to maintain a gap (not shown) between the collar 601 and the gas-delivery conduit 603. The mating collar 601 is mounted using a set of brackets 606 to a fence 607 that surrounds the collar 601 and gas-delivery conduit 603. In an embodiment, the fence is cylindrical and semipermeable. In an embodiment, the fence 607 extends farther up the liquid seal and forms an inner annular chamber 650 and excludes an outer annular chamber 651. The fence serves to mitigate unwanted bulk motion of the liquid and mitigates unwanted mixing of liquid within the inner annular chamber 650 with liquid within the outer annular chamber 651. The liquid seal 690 is filled with liquid (not shown) to a liquid level 612, which is sufficient to submerge the discharge end 604 of the gas-delivery conduit 603. The liquid seal mating system 600 includes the outer chevron 615 attached to the fence 607 and extending inward toward the gas-delivery conduit 603 and extending upward toward the liquid level 612. The outer chevron 615 reduces unwanted bulk motion of the liquid that is caused by motion of a discharge gas (not shown) after it exits the discharge end 604 of the gas-delivery conduit 603 and travels upward toward the liquid level 612. The liquid seal mating system 600 is an example of the liquid seal mating system 100, of FIG. 1, including only certain components from the description of FIG. 1. The mating collar 601, outer shell 602, gas-delivery conduit 603, discharge end 604, brackets 606, fence 607, liquid level 512, and outer chevron 615 are examples of the mating collar 101, outer shell 102, gas-delivery conduit 103, discharge end 104, brackets 106, fence 107, liquid level 112, and outer chevron 115 of FIG. 1, respectively, and the descriptions of each respective element apply between the two figures.

Figure 7:
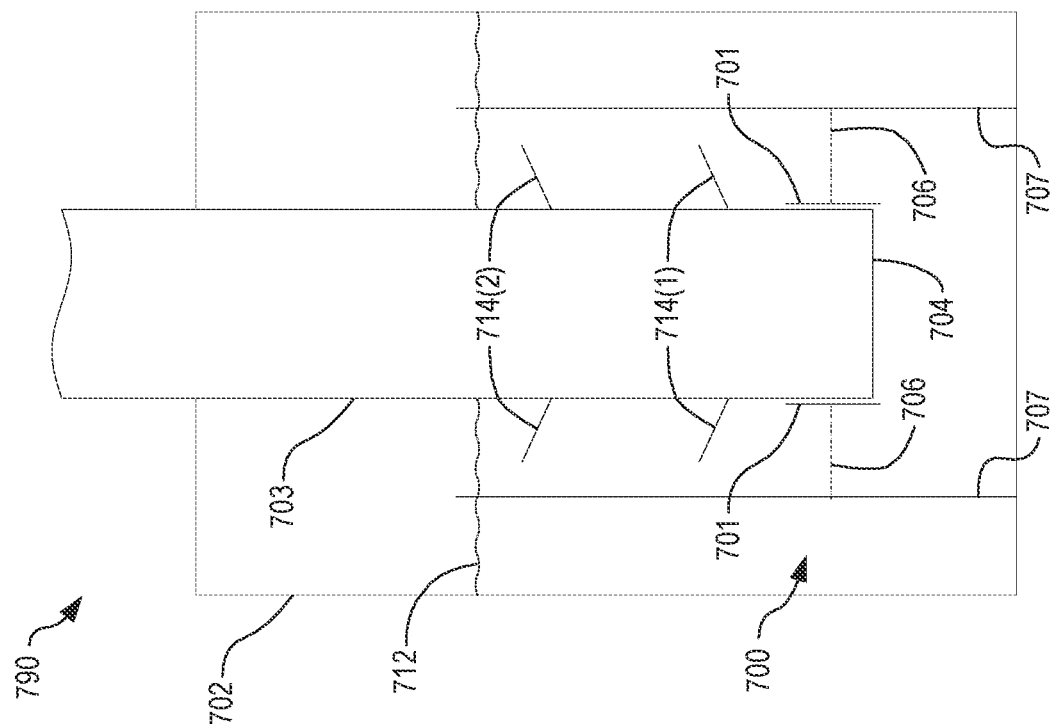
FIG. 7 illustrates a configuration of at least some components of the liquid seal mating system of FIG. 1 with a set of inner chevrons installed, according to an embodiment.

FIG. 7 illustrates a cross-sectional side view of one liquid seal mating system 700 with a set of inner chevrons installed in a liquid seal 790 (which is an example of the liquid seal 190 of FIG. 1). The liquid seal 790 includes an outer shell 702 into which a gas-delivery conduit 703 penetrates. A discharge end 704 of the gas-delivery conduit 703 is received by the liquid seal mating system 700, which includes a mating collar 701 that is sized and shaped to maintain a gap (not shown) between the collar 701 and the gas-delivery conduit 703. The mating collar 701 is mounted using a set of brackets 706 to a fence 707 that surrounds the collar 701 and gas-delivery conduit 703. In an embodiment, the fence is cylindrical. In an embodiment, the fence 707 extends farther up the liquid seal. The liquid seal 790 is filled with liquid (not shown) to a liquid level 712, which is sufficient to submerge the discharge end 704 of the gas-delivery conduit 703. The liquid seal mating system 700 includes the set of inner chevrons 714 attached to the gas-delivery conduit 703 and extending outward toward the fence 707 and extending upward toward the liquid level 712. The set of inner chevrons 714 reduces unwanted bulk motion of the liquid that is caused by motion of a discharge gas (not shown) after it exits the discharge end 704 of the gas-delivery conduit 703 and travels upward toward the liquid level 712. The liquid seal mating system 700 is an example of the liquid seal mating system 100, of FIG. 1, including only certain components from the description of FIG. 1. The mating collar 701, outer shell 702, gas-delivery conduit 703, discharge end 704, brackets 706, and fence 707, liquid level 712, and inner chevrons 714 are examples of the mating collar 101, outer shell 102, gas-delivery conduit 103, discharge end 104, brackets 106, and fence 107, liquid level 112, and inner chevrons 114 of FIG. 1, respectively, and the descriptions of each respective element apply between the two figures.

Figure 8:
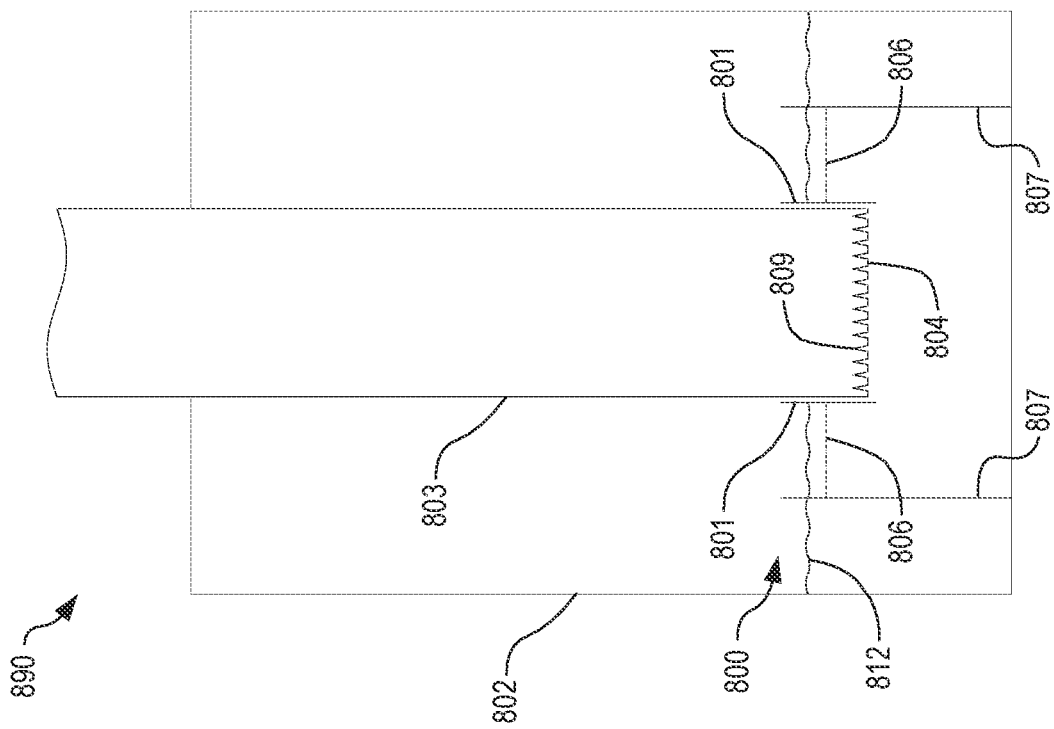
FIG. 8 illustrates a configuration of at least some components of the liquid seal mating system of FIG. 1 with saw-tooth openings installed, according to an embodiment.

FIG. 8 illustrates a cross-sectional side view of one liquid seal mating system 800 with a plurality of saw-tooth openings installed in a liquid seal 890 (which is an example of the liquid seal 190 of FIG. 1). The liquid seal 890 includes an outer shell 802 into which a gas-delivery conduit 803 penetrates. A discharge end 804 of the gas-delivery conduit 803 is received by the liquid seal mating system 800, which includes a mating collar 801 that is sized and shaped to maintain a gap (not shown) between the collar 801 and the gas-delivery conduit 803. The mating collar 801 is mounted using a set of brackets 806 to a fence 807 that surrounds the collar 801 and gas-delivery conduit 803. The discharge end 804 of the gas-delivery conduit 803 has a saw-tooth profile formed by of the plurality of saw-tooth openings 809 that defines discharge openings. The liquid seal 890 is filled with liquid (not shown) to a liquid level 812, which is sufficient to submerge the discharge end 804 of the gas-delivery conduit 803. The plurality of saw-tooth openings 809 allow discharge gas (not shown) to exit the gas-delivery conduit 803 at different rates depending on the pressure of the discharge gas, which has the beneficial outcome of reducing unwanted bulk motion of the liquid. The liquid seal mating system 800 is an example of the liquid seal mating system 100, of FIG. 1, including only certain components from the description of FIG. 1. The mating collar 801, outer shell 802, gas-delivery conduit 803, discharge end 804, brackets 806, fence 807, plurality saw-tooth openings 809, and liquid level 812 are examples of the mating collar 101, outer shell 102, gas-delivery conduit 103, discharge end 104, brackets 106, fence 107, plurality of saw-tooth openings 109, and liquid level 112 of FIG. 1, respectively, and the descriptions of each respective element apply between the two figures.

Figure 9:
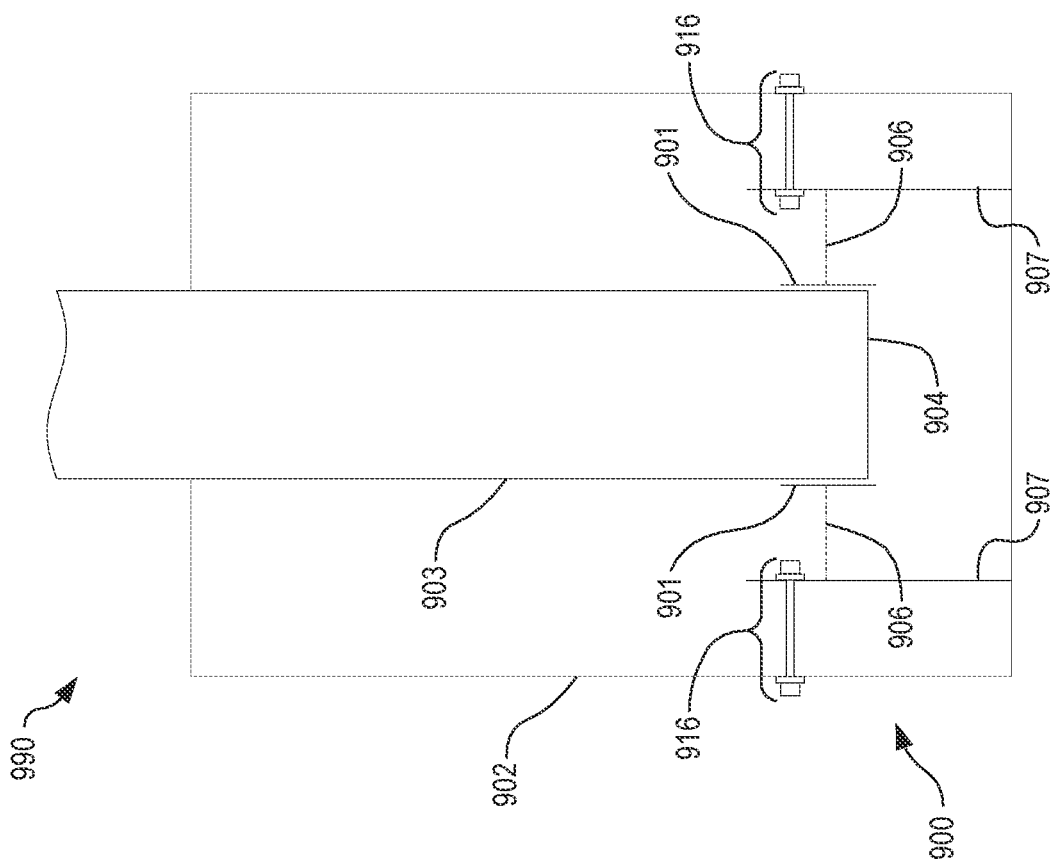
FIG. 9 illustrates a configuration of at least some components of the liquid seal mating system of FIG. 1 with a set of mounting fixtures installed, according to an embodiment.

FIG. 9 illustrates a cross-sectional side view of one liquid seal mating system 900 with a set of mounting fixtures installed in a liquid seal 990 (which is an example of the liquid seal 190 of FIG. 1). The liquid seal 990 includes an outer shell 902 into which a gas-delivery conduit 903 penetrates. A discharge end 904 of the gas-delivery conduit 903 is received by the liquid seal mating system 900, which includes a mating collar 901 that is sized and shaped to maintain a gap (not shown) between the collar 901 and the gas-delivery conduit 903. The mating collar 901 is mounted using a set of brackets 906 to a fence 907 that surrounds the collar 901 and gas-delivery conduit 903. The fence 907 is attached to the outer shell 902 by the set of mounting fixtures 916. The mounting fixtures provide additional mechanical support for the fence 907 during transportation of the liquid seal 990 and liquid seal mating system 900. The set of mounting fixtures 916 are removed before operation of the liquid seal 990 to prevent mechanical strain on the liquid seal mating system 900 and liquid seal 990 caused by thermal expansion. The liquid seal mating system 900 is an example of the liquid seal mating system 100, of FIG. 1, including only certain components from the description of FIG. 1. The mating collar 901, outer shell 902, gas-delivery conduit 903, discharge end 904, brackets 906, fence 907, and mounting fixtures 916 are examples of the mating collar 101, outer shell 102, gas-delivery conduit 103, discharge end 104, brackets 106, fence 107, and mounting fixtures 116 of FIG. 1, respectively, and the descriptions of each respective element apply between the two figures.

Figure 10:
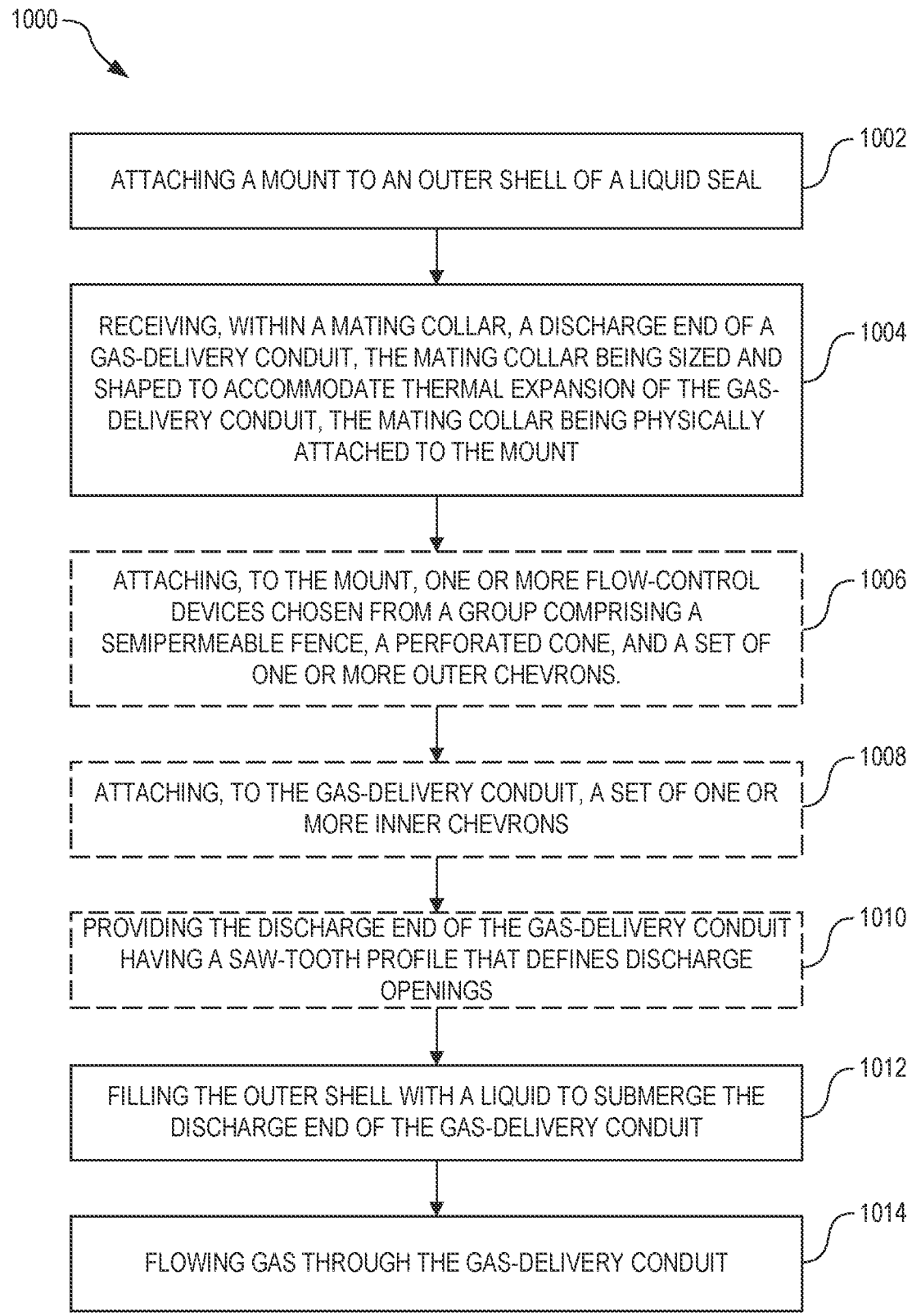
FIG. 10 illustrates a method for suppressing bulk fluid motion in an elevated-temperature liquid seal, according to an embodiment.

FIG. 10 illustrates one method 1000 for suppressing bulk fluid motion in an elevated-temperature liquid seal. Method 1000 may be used in conjunction with any of liquid seal mating systems 100, 200, 300, 400, 500, 600, 700, 800, and 900.

In block 1002 of method 1000, a mount is attached to an outer shell of a liquid seal. In one example of block 1002, the mount is attached to the outer shell 102, 302, 402, 502, 602, 702, 802, or 902.

In block 1004 of method 1000, a discharge end of a gas-delivery conduit is received in a mating collar. In one example of block 1004, the discharge end 104, 204, 304, 404, 504, 604, 704, 804, or 904 of a gas-delivery conduit 103, 203, 303, 403, 503, 603, 703, 803, or 903, respectively, is received within a collar 101 201, 301, 401, 501, 601, 701, 801, or 901, respectively.

In block 1012 the outer shell is filled with a liquid to submerge the discharge end of the gas-delivery conduit. In one example of block 1012, outer shell 102, 302, 402, 502, 602, 702, 802, or 902 is filled with a liquid to submerge the discharge end 104, 304, 404, 504, 604, 704, 804, or 904, respectively of the gas-delivery conduit 103, 303, 403, 503, 603, 703, 803, or 903, respectively.

In the block 1014 of method 1000, gas is flowed through the gas-delivery conduit. In one example of block 1014, gas is flowed through gas-delivery conduit 103, 203, 303, 403, 503, 603, 703, 803, or 903.

In certain embodiments, the method 1000 includes one or more additional blocks of the flowchart in FIG. 10 to mitigate unwanted bulk motion of the liquid during operation. In block 1006, one or more flow-control devices are attached to the mount chosen from a group including a semipermeable fence, a perforated cone, and a set of one or more outer chevrons. In one example of block 1006, the semipermeable fence 107, 207, 303, 407, 507, 607, 707, 807, or 907, is attached and in another example of block 1006 a perforated cone 113 or 513 is used. In a third example of block 1006, a set of one or more outer chevrons 115 or 615 is used.

In block 1008, one or more inner chevrons are attached to the gas-delivery conduit. In one example of block 1008, the set of one or more inner chevrons 114 or 714 is attached to the gas-delivery conduit 103 or 703.

To prevent surges in gas flow through the liquid seal that occur as a result of increased upstream pressure, in block 1010 the discharge end of a gas-delivery conduit is provided with a saw-tooth profile that defines discharge openings. In one example of block 1010, the discharge end 104 or 804 of a gas-delivery conduit 103 or 803 has a plurality of saw-tooth openings 109 or 809 that defines discharge openings.

Since the method 1000 may be used in liquid seal mating systems described previously, the description of respective components of a liquid seal system discussed above with respect to FIGS. 1-9 applies to those elements of method 1000 with like names. Furthermore, method 1000 is not limited, unless otherwise specified or understood by those of ordinary skill in the art, to the order shown in FIG. 10.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features (A1) in a first aspect, a liquid seal mating system to accommodate thermal expansion during elevated-temperature operation includes: a collar, sized and shaped to receive a discharge end of a gas-delivery conduit within the collar; a fence that surrounds the collar and the gas-delivery conduit, the collar being attached to the fence; and wherein, when installed, the collar accommodates thermal expansion of the gas-delivery conduit along a longitudinal axis of the gas-delivery conduit and limits movement of the gas-delivery conduit perpendicular to the longitudinal axis.

(A2) In an embodiment of A1, the liquid seal mating system is installed in an outer shell, the outer shell being capable of containing a liquid, the outer shell containing enough liquid to submerge the discharge end of the gas-delivery conduit.

(A3) In an embodiment of A2, the fence is attached to one or more horizontal beams, the one or more horizontal beams being physically attached to the outer shell using a slotted bolt connection that allows the one or more horizontal beams to thermally expand without transferring the expansion force to the outer shell.

(A4) In an embodiment of either A2 or A3, the fence is semipermeable and forms an inner annular chamber and excludes an outer annular chamber, the fence serving to mitigate unwanted bulk motion of the liquid, the fence further serving to mitigate unwanted mixing of liquid within the inner annular chamber with liquid within the outer annular chamber.

(A5) In an embodiment of any of A1 through A4, the liquid seal mating system further includes a perforated cone attached to the collar.

(A6) In an embodiment of any of A1 through A5, the fence has at least one outer chevron attached thereto that affect the flow of gas and liquid to reduce unwanted bulk motion of the liquid.

(A7) In an embodiment of any of A1 through A6, the gas-delivery conduit has at least one inner chevron mounted thereto that affects the flow of gas and liquid to prevent unwanted bulk motion of the liquid.

(A8) In an embodiment of any of A1 through A7, the discharge end of the gas-delivery conduit has a saw-tooth profile that defines discharge openings.

(A9) In an embodiment of any of A1 through A8, the collar is further sized and shaped to accommodate the discharge end of the gas-delivery conduit while maintaining a gap between the collar and the gas-delivery conduit.

(A10) In any embodiment in A9, the gap is 0.125 inches.

(A11) In an embodiment of any of A1 through A9, or A10, the collar measures 6 inches in the direction parallel to the longitudinal axis of the gas-delivery conduit.

(A12) In an embodiment of any of A1 through A11, the collar being attached to the fence with one or more brackets.

(A13) In an embodiment of any of A1 through A12, the fence having one or more fixtures that connect directly to the outer shell to support the fence during shipping or transportation of the liquid seal mating system and outer shell.

(B1) In a second aspect, a method for suppressing bulk fluid motion in an elevated-temperature liquid seal, includes: attaching a mount to an outer shell of a liquid seal; receiving, within a mating collar, a discharge end of a gas-delivery conduit, the mating collar being sized and shaped to accommodate thermal expansion of the gas-delivery conduit, the mating collar being physically attached to the mount; filling the outer shell with a liquid to submerge the discharge end of the gas-delivery conduit; and flowing gas through the gas-delivery conduit (B2) In an embodiment of B1, attached to the mount is one or more flow-control devices chosen from a group including a semipermeable fence, a perforated cone, and a set of one or more outer chevrons.

(B3) In an embodiment of either B1 or B2, attached to the gas-delivery conduit is a set of one or more inner chevrons.

(B4) In an embodiment of any of B1 through B3, the discharge end of the gas-delivery conduit has a saw-tooth profile that defines discharge openings.

(C1) In a third aspect, a liquid seal mating system to accommodate thermal expansion during elevated-temperature operation includes: a mount attached to an outer shell of a liquid seal; and a collar that is sized and shaped to receive a discharge end of a gas-delivery conduit while accommodating thermal expansion of the gas-delivery conduit, the collar being attached to the mount.

(C2) In an embodiment of C1, the liquid seal mating system includes one or more flow control devices chosen from a group including a semipermeable fence, a perforated cone, and a set of one or more outer chevrons, the flow control devices attached to the mount.

(C3) In an embodiment of either C1 of C2, the liquid seal mating system further includes a set of one or more inner chevrons attached to the gas-delivery conduit.

(C4) In an embodiment of any of C1 through C3, the discharge end of the gas-delivery conduit has a saw-tooth profile that defines discharge openings.

Any feature of the first, second, and third aspects described above are interchangeable with other of the described aspects, unless otherwise specified or understood by those of ordinary skill in the art.

What is claimed is:

1. A liquid seal mating system to accommodate thermal expansion during elevated-temperature operation, comprising:
   a collar, sized and shaped to receive a discharge end of a gas-delivery conduit within the collar;
   a fence that surrounds the collar and the gas-delivery conduit, the collar being attached to the fence; and
   wherein, when the collar is installed, the gas-delivery conduit is free to move with respect to the collar along a longitudinal axis of the gas-delivery conduit and is partially constrained from moving in any direction that is not along or perpendicular to the longitudinal axis.

2. The liquid seal mating system of claim 1, the discharge end of the gas-delivery conduit having a saw-tooth profile that defines discharge openings.

3. The liquid seal mating system of claim 1, the collar being further sized and shaped to accommodate the discharge end of the gas-delivery conduit while maintaining a gap between the collar and the gas-delivery conduit.

4. The liquid seal mating system of claim 3, the gap being 0.125 inches.

5. The liquid seal mating system of claim 1, the collar measuring 6 inches in the direction parallel to the longitudinal axis of the gas-delivery conduit.

6. The liquid seal mating system of claim 1, the collar being attached to the fence with one or more brackets.

7. The liquid seal mating system of claim 1, the liquid seal mating system being installed in an outer shell, the outer shell being capable of containing a liquid, the outer shell containing enough liquid to submerge the discharge end of the gas-delivery conduit, the fence having one or more fixtures that connect directly to the outer shell to support the fence during shipping or transportation of the liquid seal mating system and outer shell.

8. The liquid seal mating system of claim 1, wherein the collar and the fence do not physically attach to the gas delivery conduit.

9. The liquid seal mating system of claim 1, wherein the liquid seal mating system allows movement of the gas delivery conduit without causing mechanical stress on the collar by maintaining a gap between the gas delivery conduit and the liquid seal mating system.

10. A liquid seal mating system to accommodate thermal expansion during elevated-temperature operation, comprising:
    a collar, sized and shaped to receive a discharge end of a gas-delivery conduit within the collar;
    an outer shell, the outer shell being capable of containing a liquid, the outer shell containing enough liquid to submerge the discharge end of the gas-delivery conduit;
    a fence that surrounds the collar and the gas-delivery conduit, the collar being attached to the fence, the fence being attached to one or more horizontal beams, the one or more horizontal beams being physically attached to the outer shell using a slotted bolt connection that allows the one or more horizontal beams to thermally expand without transferring the expansion force to the outer shell; and
    wherein, when installed, the collar accommodates thermal expansion of the gas-delivery conduit along a longitudinal axis of the gas-delivery conduit and limits movement of the gas-delivery conduit perpendicular to the longitudinal axis.

11. The liquid seal mating system of claim 10, the fence being semipermeable and forming an inner annular chamber and excluding an outer annular chamber, the fence serving to mitigate unwanted bulk motion of the liquid, the fence further serving to mitigate unwanted mixing of liquid within the inner annular chamber with liquid within the outer annular chamber.

12. The liquid seal mating system of claim 10, the fence having at least one outer chevron attached thereto that affect the flow of gas and liquid to reduce unwanted bulk motion of the liquid.

13. The liquid seal mating system of claim 10, the gas-delivery conduit having at least one inner chevron mounted thereto that affects the flow of gas and liquid to prevent unwanted bulk motion of the liquid.

14. The liquid seal mating system of claim 10, the discharge end of the gas-delivery conduit having a saw-tooth profile that defines discharge openings.

15. The liquid seal mating system of claim 10, the collar being further sized and shaped to accommodate the discharge end of the gas-delivery conduit while maintaining a gap between the collar and the gas-delivery conduit.

16. The liquid seal mating system of claim 10, the collar being attached to the fence with one or more brackets.

17. A liquid seal mating system to accommodate thermal expansion during elevated-temperature operation, comprising:
    a collar, sized and shaped to receive a discharge end of a gas-delivery conduit within the collar;
    a perforated cone attached to the collar;
    a fence that surrounds the collar and the gas-delivery conduit, the collar being attached to the fence; and
    wherein, when installed, the collar accommodates thermal expansion of the gas-delivery conduit along a longitudinal axis of the gas-delivery conduit and limits movement of the gas-delivery conduit perpendicular to the longitudinal axis.

18. The liquid seal mating system of claim 17, the liquid seal mating system being installed in an outer shell, the outer shell being capable of containing a liquid, the outer shell containing enough liquid to submerge the discharge end of the gas-delivery conduit, the fence having one or more fixtures that connect directly to the outer shell to support the fence during shipping or transportation of the liquid seal mating system and outer shell.

19. The liquid seal mating system of claim 17, the discharge end of the gas-delivery conduit having a saw-tooth profile that defines discharge openings.

20. The liquid seal mating system of claim 17, the collar being further sized and shaped to accommodate the discharge end of the gas-delivery conduit while maintaining a gap between the collar and the gas-delivery conduit.

* * * * *